United States Patent [19]

Eichin

[11] 4,033,382

[45] July 5, 1977

[54] SELF-SUSTAINING STICK OF SHIRRED FOOD CASING

[75] Inventor: Harry P. Eichin, Western Springs, Ill.

[73] Assignee: Union Carbide Corporation, New York, N.Y.

[22] Filed: Nov. 18, 1974

[21] Appl. No.: 524,719

[52] U.S. Cl. .......................... 138/118.1; 138/109; 138/121
[51] Int. Cl.² .................. F16L 11/08; F16L 11/10
[58] Field of Search ............... 138/118.1, 121, 124, 138/125, 109, 122; 426/105, 135, 138, 140

[56] References Cited

UNITED STATES PATENTS

| | | | |
|---|---|---|---|
| 3,528,825 | 9/1970 | Doughty | 426/506 X |
| 3,639,130 | 2/1972 | Eichin et al. | 138/118.1 |
| 3,907,003 | 9/1975 | Regner et al. | 138/118.1 |
| 3,924,661 | 12/1975 | Bornhoffer | 138/110 |

*Primary Examiner*—Richard E. Aegerter
*Assistant Examiner*—James E. Bryant, III
*Attorney, Agent, or Firm*—David Fink

[57] ABSTRACT

A self-sustaining length of shirred tubular food casing comprising a stick of shirred and compressed tubular food casing having a bore extending therethrough and a sheathing material closely drawn about the periphery of said stick of shirred food casing and down about at least a portion of the terminal pleats at each end thereof and terminating at each end thereof in a reinforced aperture aligned with the bore through said shirred casing stick, said sheathing material totally retaining said stick of shirred food casing therein and forming a self-sustaining length thereof that will not be prematurely deshirred.

4 Claims, 8 Drawing Figures

U.S. Patent
July 5, 1977
4,033,382
FIG. 1
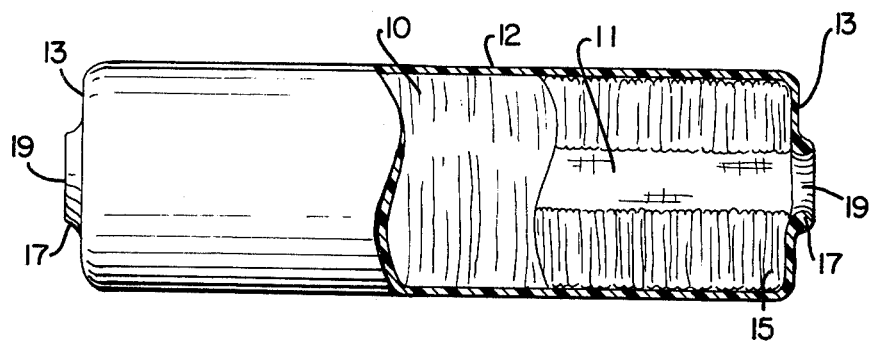
FIG. 2
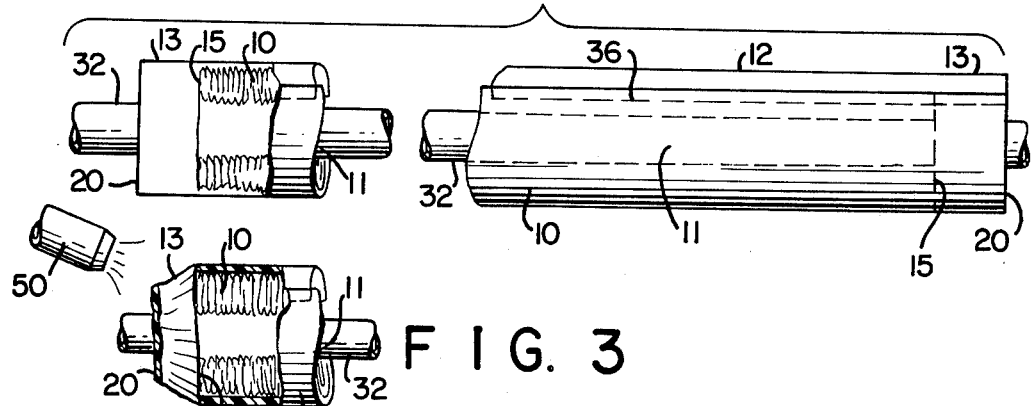
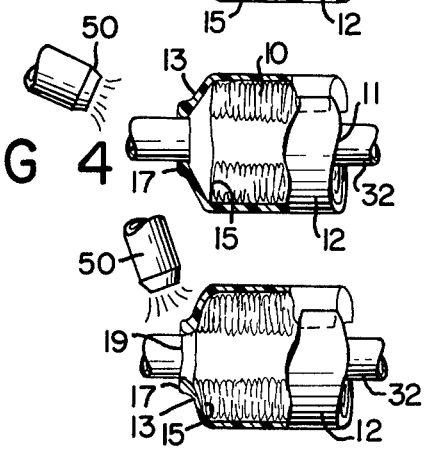
FIG. 4
FIG. 5
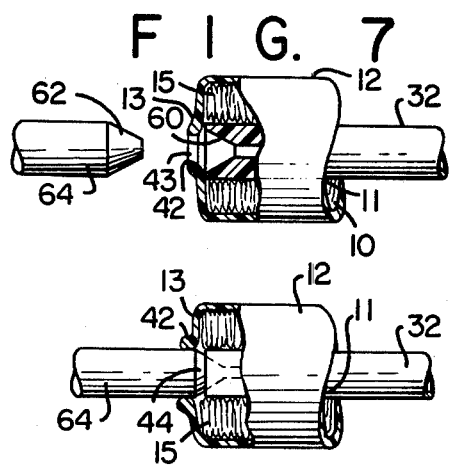
FIG. 7
FIG. 8
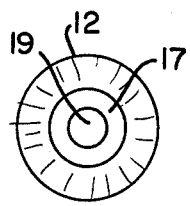
FIG. 6

SELF-SUSTAINING STICK OF SHIRRED FOOD CASING

This invention relates to a stick of shirred, compressed food casing and, more particularly, to a stick of shirred tubular food casing retained within a sheathing material to protect the stick from premature deshirring, and to a method for preparing the same.

Tubular cellulosic food casings of intermediate and large size, either reinforced with fibrous web material or not, are produced in circumference sizes generally ranging from about 5 inches to about 15 inches. These tubular casings have a wall thickness greater than that of the small-diameter tubular casings used in the production of sausages such as frankfurters and which generally have a circumference within the range of from about 1¾ inches to about 4¾ inches. When shirred, using methods and apparatus well known in the art as, for example, disclosed in U.S. Pat. Nos. 2,983,949 and 2,984,574 to Matecki, the pleats formed in the thicker walls of larger size tubular casing cannot be compacted as much as those in the thinner walls of small-diameter casings. As a result, the sticks of shirred and compressed casing do not retain their integrity, and tend to break and deshirr. In order to overcome this disadvantage, the shirred sticks of larger sized tubular casings are conventionally provided with a support core, preferably in the form of a tube of plastic material, inserted into the bore of the stick immediately after compressing the shirred stick, with deshirring or premature separation of the compressed pleated casing being prevented by a pin or peg extending transversely through the walls of the support tube at both extremities thereof restraining the stick endwise.

This core and peg arrangement is relatively expensive. Moreover, before the meat-stuffing operation, the shirred casing sticks must be immersed and soaked in water to impart to the wall of the casing the flexibility necessary for such operation and the core and restraining pegs do not permit ready soaking of the inside wall of the compressed sticks. Furthermore, for the stuffing operation, the core tube and peg arrangement does not permit ready placement on a sutffing horn without additional time-consuming manipulation by the stuffer operator.

Other techniques for supporting a shirred casing stick and preventing premature deshirring thereof have been shown in the patent literature and specific reference is made to U.S. Pat. Nos. 3,446,634 to Stahlberger, 3,528,825 to Doughty and 3,639,130 to Eichin.

However, there is still the demand for a method of retaining shirred casing sticks and preventing premature deshirring thereof that is simple and economical to use, which permits the shirred casing stick to be readily moisturized without undue manipulation and danger of premature deshirring and allows ready placement of the shirred casing stick on a stuffing horn.

In accordance with the present invention, there is provided a self-sustaining length of shirred and compressed tubular food casing comprising a length of shirred and compressed tubular food casing having a bore extending therethrough and having a sheathing material closely drawn and tensioned about the periphery of said shirred casing and down about at least a portion of the terminal pleats at each end thereof, said sheathing material having an integral reinforced aperture at each end thereof aligned with the bore through said shirred tubular casing.

There is also provided, in accordance with the present invention, a method for preparing a self-sustaining length of shirred and compressed tubular food casing having a central bore extending therethrough which comprises supporting a length of shirred and compressed tubular food casing having a substantially straight bore extending therethrough about a mandrel, providing a length of heat shrinkable sheathing material and arranging said sheathing material about the periphery of said supported shirred casing with the ends thereof extending beyond the ends of said shirred casing, shrinking said sheathing material about the periphery of said shirred casing so that it is closely drawn thereabout, and shrinking the sheathing material extending beyond each of the ends of said shirred casing so that it is closely drawn about at least a portion of the terminal pleats at each end of said shirred casing and forms integral reinforced apertures therein aligned with the bore extending through said shirred casing whereby said length of compressed, shirred casing is retained totally within said sheathing material without resticting the bore therethrough.

An advantageous aspect of the sheathed length of shirred and compressed tubular food casing of the present invention is that the compressed length of shirred casing is substantially maintained and the tubular casing material may be moisturized by immersing in water without removing the sheathing material. Furthermore, the sheathing material and reinforced end portions thereof will restrain expansion in the tubing length due to increased moisture content and retain the terminal pleats of the moisturized casing thereby permitting the moisturized shirred casing to be readily mounted on various type of stuffing horns.

The article and method the present invention will become more fully apparent from the following description and the accompanying drawing in which:

FIG. 1 is a side view, partially in section, of an exemplary embodiment of a self-sustaining length of shirred and compressed tubular food casing of the invention.

FIG. 2 is a side view, part in section and part broken away, of a mandrel with a shirred and compressed stick of food casing on said mandrel with a sheathing material arranged thereabout.

FIGS. 3–5 are fragmentary side views, part in section, showing various steps of a typical method for preparing the sheathed, shirred stick of food casing illustrated in FIG. 1.

FIG. 6 is the end view of the sheathed stick prepared as illustrated in FIGS. 3–5.

FIGS. 7–8 are fragmentary side views, part in section, of an alternate embodiment of a method for preparing the sheathed shirred stick of casing illustrated in FIG. 1.

Referring now to the drawing, there is shown in FIG. 1 a stick 10 of shirred and compressed tubular food casing having a bore 11 extending therethrough. The stick 10 of shirred casing is contained within a sheathing material 12 that is closely drawn and tensioned about the periphery of said stick of shirred casing with the portions 13 of sheathing material 12 extending beyond the ends of said stick being drawn down about at least a portion of the terminal pleats 15 at each end of the stick 10 of shirred casing forming end walls therefor. In each end of the sheathing material 12 is an aperture 19 that is substantially aligned with the bore 11 through said stick 10 of shirred casing with the sheathing material defining the edge of each aperture 19 being formed into an integral reinforcing bead 17. The apertures 19 in the ends of the sheathing material 12 should generally be of a diameter large enough that the bore 11 is not occluded; however, they should not be so large that the reinforced end walls do not retain the compressed length of shirred casing stick 10 and terminal pleats 15 thereof during handling and further processing.

Shirred tubular food casings that may be employed in accordance with the practice of the invention are food casings, and preferably regenerated cellulosic food casings, prepared by any of the well known methods and including fibrous food casing that has a fibrous web embedded in the wall thereof.

Material constituting the sheathing material of the present invention may be prepared from any one of a wide variety of film forming polymers and copolymers well known in the art as, for example, polyvinylidene chloride and copolymers thereof, polyvinylchloride, polyethylene and other polyolefins, polyesters and the like. Especially preferred are sheathing materials prepared from heat-shrinkable plastic film or plastic film that exhibits some heat-shrinking characteristics. Suitable plastic film sheathing material may be translucent, opaque or transparent and may have a film thickness between about 0.0005 inch and 0.003 inch, or greater, depending on the size of the shirred casing stick to be enveloped and length of tubular casing incorporated in said stick. In addition, suitable plastic film sheathing material may be a continuous film or perforated.

It is essential that the sheathing material be closely drawn and tensioned about the periphery and ends of the compressed shirred tubular casing and that the physical properties of the sheathing material are suitable to restrain the original longitudinal compression on the shirred casing, restrain the contents during handling and further processing and thereby maintain its physical integrity. It is particularly preferred that the ends of the sheathing material which are closely drawn about and retain the terminal pleats of said casing stick and terminate in apertures, are provided with integral reinforcement means therein as, for example, the reinforcing beads 17 or thickened wall sections formed by fusing overfolded film material and the like.

In general, suitable sheathing material may be seamless or seamed tubing that may be prepared as individual discrete lengths or cut from continuous lengths of tubing, or may be sheet material that is formed about the shirred casing stick and then heat sealed. Perforations can be provided in the sheathing material to facilitate the imbibing of water by the outer surface of the compressed pleats. Such perforations can be of a size, shape and placement to not adversely affect the strength of the sheathing material.

A typical method of preparing the sheathed, shirred casing stick of the present invention as, for example, the sheathed stick of FIG. 1 is illustrated in FIGS. 2 to 6. FIG. 2 shows a stick of shirred and compressed tubular food casing 10 having a bore 11 therethrough mounted on a mandrel 32. The mandrel may be the end of a shirring mandrel that is part of the shirrring apparatus or may be an auxiliary mandrel to which the casing stick was moved after completion of the shirring and compression operations. A sheet of plastic film sheathing material 12, preferably made of heat shrinkable polyethylene, has been formed into a closely fitting tube about the length of shirred casing and overlapping portions thereof were heat sealed, using techniques well known in the art, forming a longitudinal seam 36. End portions 13 of the sheathing material 12 extend beyond the ends of the terminal pleats 15 of the shirred casing stick 10.

A blast of hot air from "shrink gun" 50 (FIGS. 3, 4 and 5) is then directed over the end portion 13 of the sheathing material extending beyond the end of shirred stick 10 causing the film to shrink and draw down about the terminal pleats 15 at the end of the shirred stick 10 (FIGS. 3–5). The terminal end 20 of the film sheathing material is also melted back and fused into a reinforcing bead 17 about an aperture 19 in the sheathing material (FIG. 6). It will be obvious that both ends 13 of the sheathing material 12 may be simultaneously heat shrunk about the terminal pleats 15 at each end of the shirred casing stick 10.

The sheathing material 12 about the periphery of the shirred casing stick 10 may then be heated by the shrink gun 50, or by passing the supported casing stick through a heating chamber to shrink the sheathing material so that it is closely drawn about the periphery of the shirred casing stick 10. It is preferred to initially heat shrink end portions 13 about the terminal pleats 15 and then to heat shrink the intermediate portions of the sheathing material 12 to thereby obtain a taut package suitable for containing the contents during handling, and to restain endwise expansion forces of the compressed casing. After the film cools, the sheathed, shirred casing stick may be doffed from about the support mandrel 32. The sheathed stick of shirred tubular food casing prepared as described above is a self-sustaining stick of shirred casing that can be grasped and carried without breaking or premature separation and has an unrestricted bore that permits ready installation of the shirred stick on a stuffing horn.

Flexible plastic film suitable for use as a sheathing material in accordance with the present invention may be preformed into a seamed or seamless tubing. The internal diameter of said preformed tubing should be large enough so that it may be readily positioned about a shirred casing without disrupting the integrity thereof but should not, of course, be so large in diameter that it will not be closely drawn and tensioned about the shirred stick on heat-shrinking. In general, the diameter of a preformed tube should be about 5–10% larger than the outer diameter of the shirred casing stick. It is essential that the sheathing material used is long enough to contain the full length of the compressed length of shirred food casing and at least a portion of the terminal pleats at each end of shirred casing. It is also important that enough material is available for the formation of an integral reinforced section to retain the terminal pleats of the shirred casing without restriction of the bore therethrough.

In an alternative embodiment, a short portion of the end portions 13 of the sheathing material 12 that extends beyond the ends of the shirred casing stick 10 may be overfolded or infolded. Upon application of heat during heat-shrinking of the sheathing material, the folded portions of sheathing material are fused together as they shrink down about the terminal pleat 15 of the shirred casing thereby forming reinforced apertured end-walls for the sheathed casing.

In another alternative embodiment (FIGS. 7–8), each end of the mandrel 32 is provided with a funnel-shaped recess to serve as a drogue 60 for mating with a probe portion 62 of heated forming mandrel 64. Mandrel 64 can be of the same or greater diameter than that of mandrel 32. By juxtaposing the end of drogue 60 with the terminal pleats 15 of the shirred casing stick 10, heat shrinking of end portion 13 of the sheathing material provides a reinforcing bead 42 about an aperture 43 that is smaller than the casing bore 11 (FIG. 7). In a succeeding step, probe portion 62 of mandrel 64 is heated to a temperature sufficient to soften, thicken and reshape bead 42 to an aperture 44 that is equal to or greater than bore 11 (FIG. 8). Thus more heat shrinkable material can be provided to form a stronger size-controlled reinforcing bead 42 at each end of the stick and yield a sheathed stick of shirred casing that is highly resistant to endwise expansion forces without restriction of the bore therethrough.

As already mentioned, the self-sustaining stick of shirred tubular food casing of the present invention may be soaked in water, when necessary to increase the flexibility of the tubular casing, without premature separation of the compressed pleats and the moisturized stick may then be placed on a stuffing horn without undue manipulation and without the need to remove the sheathing material. Furthermore, it is possible for the tubular casing to be stuffed with food emulsion without removing the sheathing material or by removing only a portion of the sheathing end-wall thereby preventing undesirable premature deshirring of the shirred stick while mounted on a stuffing horn.

What is claimed is:

1. A self-sustaining length of shirred and compressed tubular food casing comprising in combination:
   a. a stick of shirred and compessed tubular food casing having a bore extending therethrough; and
   b. a thin, flexible sheathing material having an aperture with a reinforced edge at each end thereof that is closely drawn and tensioned about the periphery of the full length of said stick of shirred casing and with each of the ends thereof being closely drawn down about at least a portion of the pleats at each end of said stick, and terminating in an aperture with an integral fused bead of sheathing material forming the edges thereof, said reinforced apertures being smaller than the outer diameter of said shirred stick and substantially aligned with the bore through said shirred casing stick, said sheathing material totally retaining said stick of shirred food casing therein and forming a self-sustaining length thereof.

2. The self-sustaining length of shirred food casing of claim 1 wherein said sheathing material is a thin-walled plastic film.

3. The self-sustaining length of shirred food casing of claim 1 wherein said shirred tubular casing has a fibrous web embedded in the wall thereof.

4. The self-sustaining length of food casing of claim 1 wherein the bore of said stick is not occluded.

* * * * *